US007104472B2

(12) United States Patent
Renquist

(10) Patent No.: US 7,104,472 B2
(45) Date of Patent: Sep. 12, 2006

(54) CONSTANT VELOCITY TURBINE AND STATOR ASSEMBLIES

(75) Inventor: Steven C. Renquist, Chino Hills, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/188,467

(22) Filed: Jul. 25, 2005

(65) Prior Publication Data

US 2005/0252991 A1 Nov. 17, 2005

Related U.S. Application Data

(62) Division of application No. 10/302,548, filed on Nov. 21, 2002, now Pat. No. 6,921,030.

(60) Provisional application No. 60/357,220, filed on Feb. 14, 2002.

(51) Int. Cl.
*B05B 1/34* (2006.01)
*B05B 3/02* (2006.01)
*B05B 3/06* (2006.01)
*G05D 11/00* (2006.01)

(52) U.S. Cl. .................. 239/380; 239/214.3; 239/252; 239/256; 239/222.15; 239/240; 239/264; 137/119.07; 137/511

(58) Field of Classification Search ........... 137/119.07, 137/511; 239/214.13, 252, 256, 222.15, 239/240; 251/264; 210/136
See application file for complete search history.

(56) References Cited

U.S. PATENT DOCUMENTS

| | | | | |
|---|---|---|---|---|
| 3,779,269 | A * | 12/1973 | Gould | 137/119.07 |
| 3,940,066 | A * | 2/1976 | Hunter | 239/204 |
| 4,077,424 | A * | 3/1978 | Ehret et al. | 137/119.07 |
| 4,624,412 | A * | 11/1986 | Hunter | 239/232 |
| 4,842,201 | A * | 6/1989 | Hunter | 239/396 |
| 4,986,474 | A * | 1/1991 | Schisler et al. | 239/205 |
| 5,375,768 | A * | 12/1994 | Clark | 239/210 |
| 5,984,203 | A * | 11/1999 | Rosenberg | 239/222.11 |
| 6,193,169 | B1 * | 2/2001 | Steinhilber et al. | 239/240 |
| 6,539,967 | B1 * | 4/2003 | Tarr | 137/1 |
| 6,921,030 | B1 * | 7/2005 | Renquist | 239/380 |

* cited by examiner

*Primary Examiner*—David A. Scherbel
*Assistant Examiner*—James S. Hogan
(74) *Attorney, Agent, or Firm*—Inskeep IP Group, Inc.

(57) ABSTRACT

A rotary sprinkler system for both above-the ground and pop-up rotary sprinkler systems that controls the rate of nozzle rotation is disclosed. To maintain a relatively constant and controlled nozzle rotation, one or more chamfered spokes are included on the turbine of the sprinkler system. This turbine configuration together with a stator assembly that regulates fluid flow to the turbine control nozzle rotation despite variations in fluid flow. In particular, the chamfered spokes counteract the spin of the turbine in direct relation to the amount of water that bypasses the driving blades of the turbine.

20 Claims, 19 Drawing Sheets

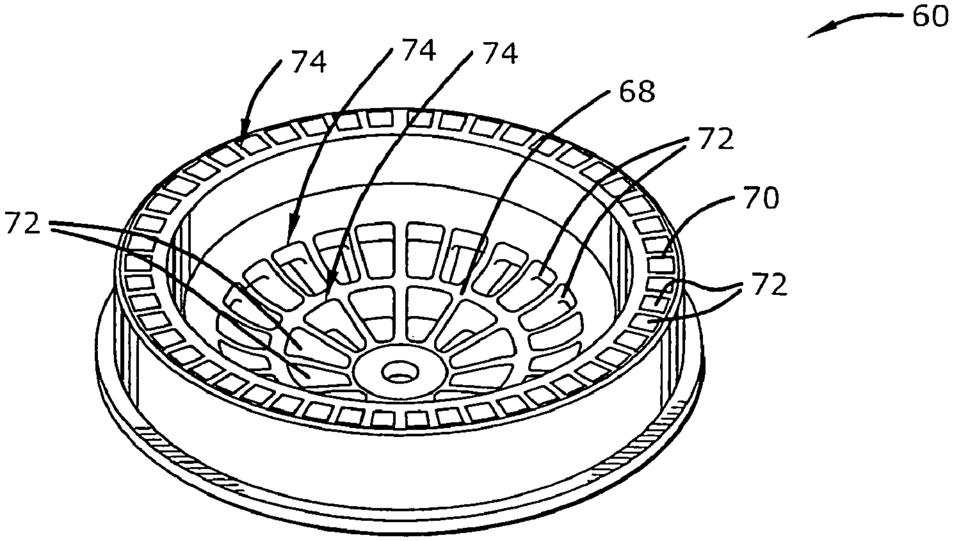
FIG. 4A
FIG. 4B
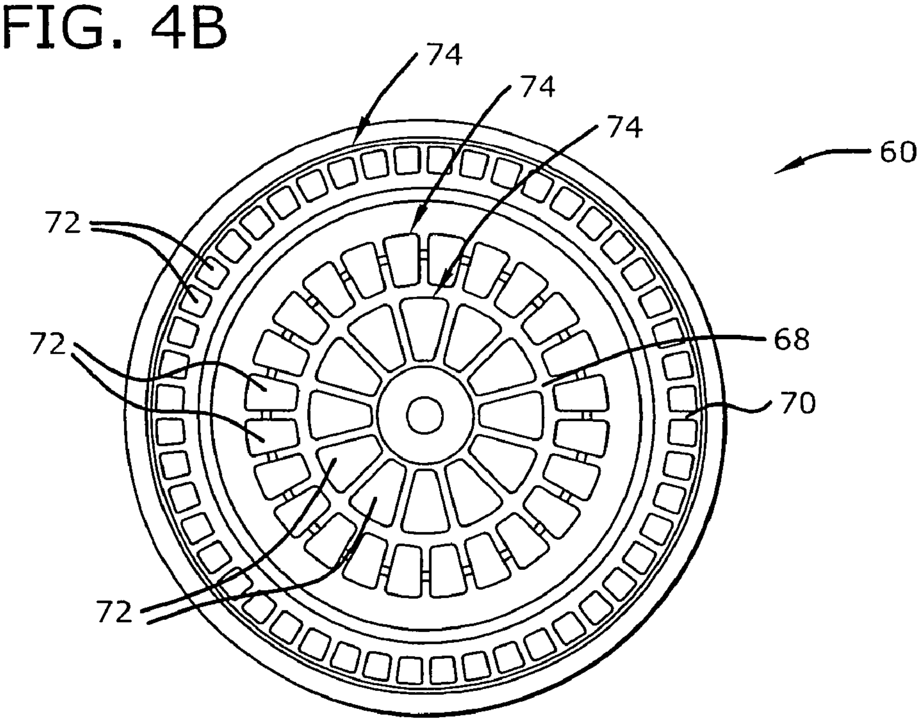

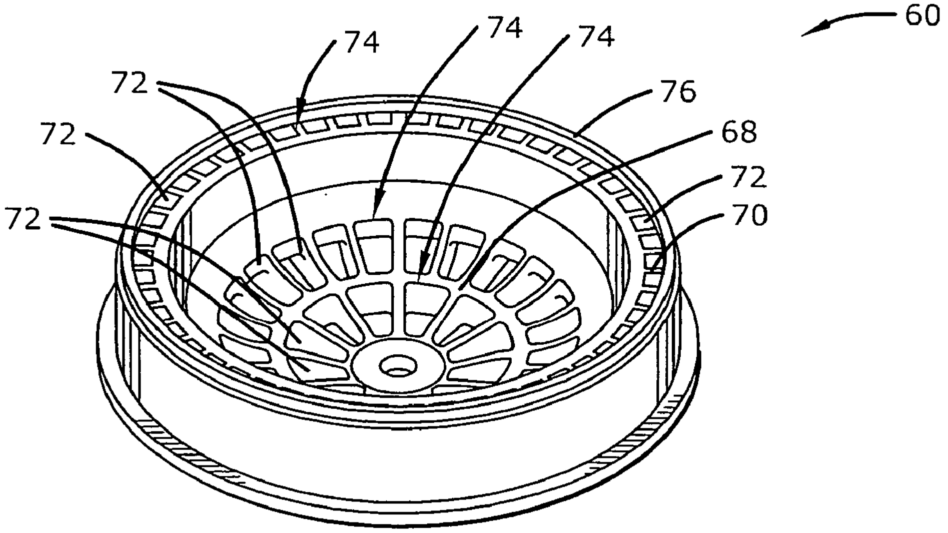
FIG. 5A
FIG. 5B
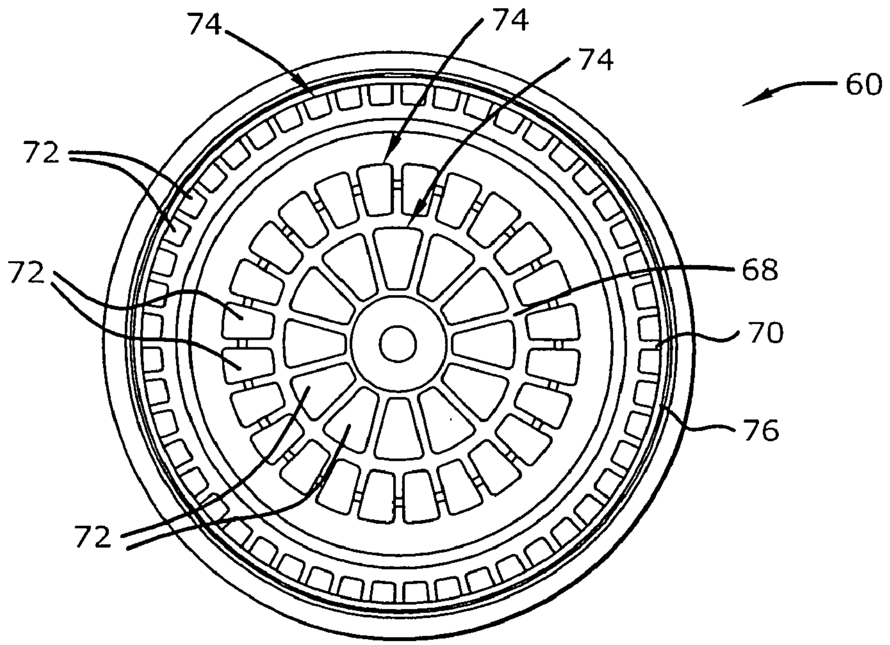

FIG. 9A
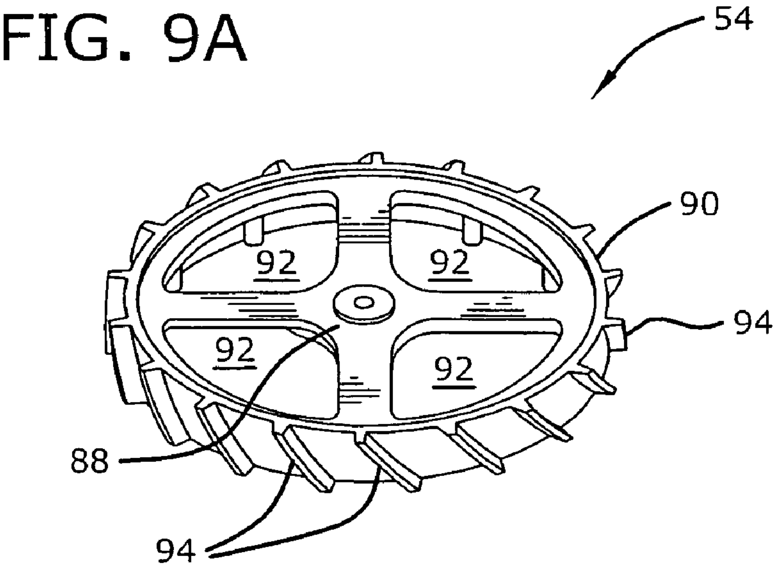
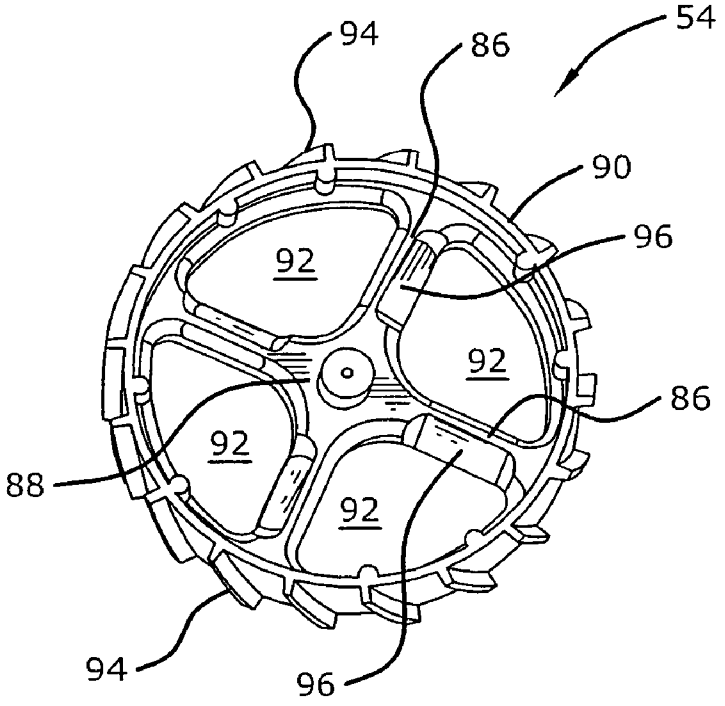
FIG. 9B

FIG. 10A
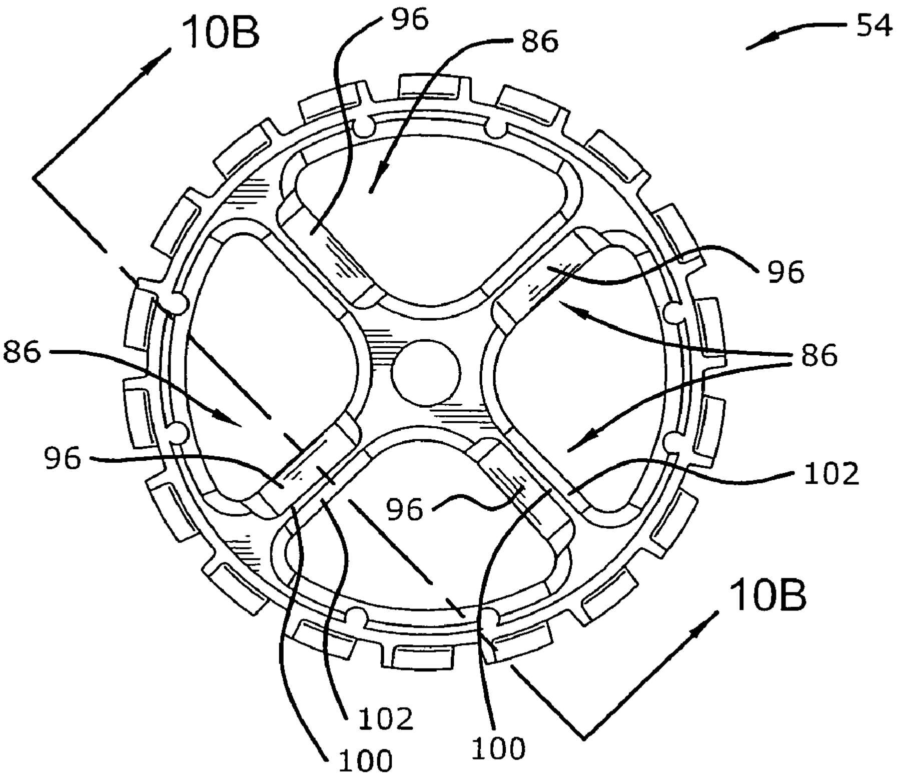
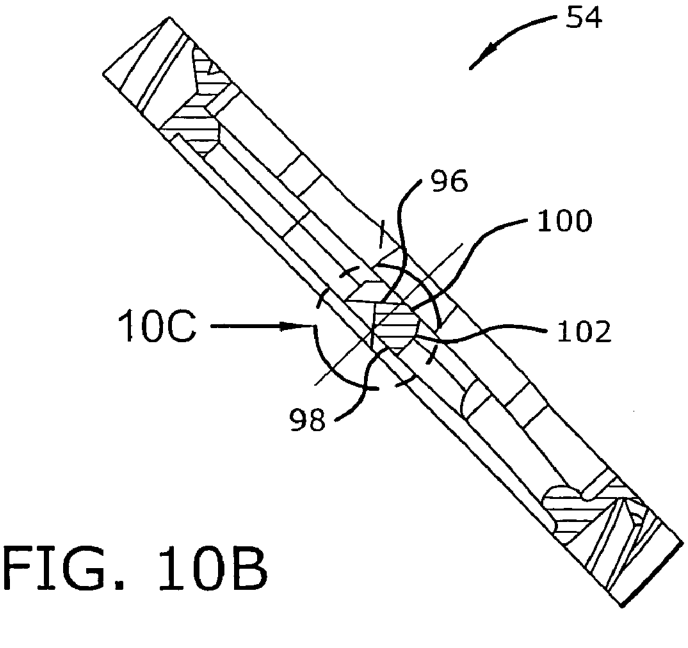
FIG. 10B

FIG. 10C
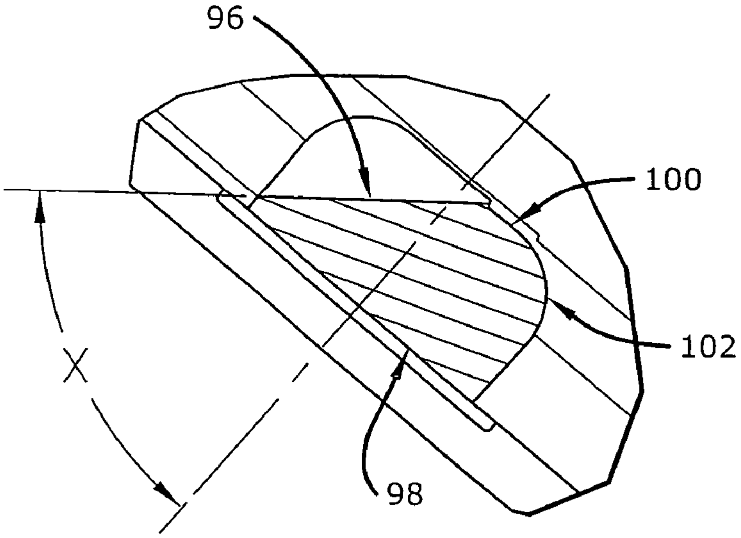
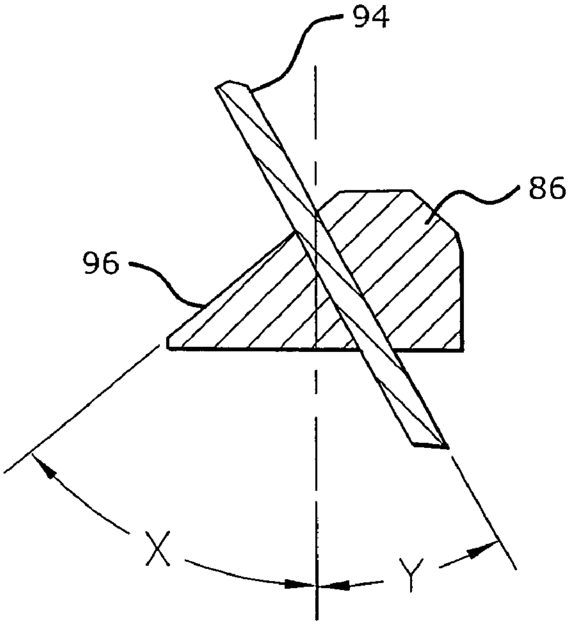
FIG. 10D

CONSTANT VELOCITY TURBINE AND STATOR ASSEMBLIES

CROSS REFERENCE TO RELATED APPLICATIONS

The present application is a divisional of U.S. patent application Ser. No. 10/302,548, filed Nov. 21, 2002, now U.S Pat. No. 6,921,030 which claims the benefit of co-pending provisional Application Ser. No. 60/357,220 filed Feb. 14, 2002, which is hereby incorporated by reference.

BACKGROUND OF THE INVENTION

Sprinkler systems for turf irrigation are well known. Typical systems include a plurality of valves and sprinkler heads in fluid communication with a water source, and a centralized controller connected to the water valves. At appropriate times the controller opens the normally closed valves to allow water to flow from the water source to the sprinkler heads. Water then issues from the sprinkler heads in predetermined fashion.

There are many different types of sprinkler heads, including above-the-ground heads and "pop-up" heads. Pop-up sprinklers, though generally more complicated and expensive than other types of sprinklers, are thought to be superior. There are several reasons for this. For example, a pop-up sprinkler's nozzle opening is typically covered when the sprinkler is not in use and is therefore less likely to be partially or completely plugged by debris or insects. Also, when not being used, a pop-up sprinkler is entirely below the surface and out of the way.

The typical pop-up sprinkler head includes a stationary body and a "riser" which extends vertically upward, or "pops up," when water is allowed to flow to the sprinkler. The riser is in the nature of a hollow tube which supports a nozzle at its upper end. When the normally-closed valve associated with a sprinkler opens to allow water to flow to the sprinkler, two things happen: (i) water pressure pushes against the riser to move it from its retracted to its fully extended position, and (ii) water flows axially upward through the riser, and the nozzle receives the axial flow from the riser and turns it radially to create a radial stream. A spring or other type of resilient element is interposed between the body and the riser to continuously urge the riser toward its retracted, subsurface, position, so that when water pressure is removed the riser will immediately proceed from its extended to its retracted position.

The riser of a pop-up or above-the-ground sprinkler head can remain rotationally stationary or can include a portion which rotates in continuous or oscillatory fashion to water a circular or partly circular area, respectively. More specifically, the riser of the typical rotary sprinkler includes a first portion which does not rotate and a second portion which rotates relative to the first (non-rotating) portion.

As shown in FIG. 1, the rotating portion of a rotary sprinkler riser 10 typically carries a nozzle 12 at its uppermost end. The nozzle 12 throws at least one water steam outwardly to one side of the nozzle assembly 14. As the nozzle assembly 14 rotates, the water stream travels or sweeps over the ground.

The non-rotating portion of a rotary sprinkler riser 10 typically includes a drive mechanism 16 for rotating the nozzle. The drive mechanism 16 generally includes a turbine 18 and a transmission 20. The turbine 18 is usually made with a series of angular vanes 22 on a central rotating shaft (not shown) that is actuated by a flow of fluid subject to pressure. The transmission 20 consists of a reduction gear train (not shown) that converts rotation of the turbine 18 to rotation of the nozzle assembly 14 at a speed slower than the speed of rotation of the turbine 18.

During use, as the initial inrush and pressurization of water enters the riser 10, it strikes against the vanes 22 of the turbine 18 causing rotation of the turbine 18 and, in particular, the turbine shaft. Rotation of the turbine shaft, which extends into the drive housing 24, drives the reduction gear train that causes rotation of an output shaft located at the other end of the drive housing 24. Because the output shaft is attached to the nozzle assembly 14, the nozzle assembly 14 is thereby rotated, but at a reduced speed that is determined by the amount of the reduction provided by the reduction gear train.

With such sprinkler systems, a wide variation in fluid flow out of the nozzle can be obtained. If the system is subject to an increase in fluid flow rate through the riser, the speed of nozzle rotation increases proportionally due to the increased water velocity directed at the vanes of the turbine. In general, increases or decreases in nozzle speed can adversely affect the desired water distribution.

In view of the above, there is a need for an improved rotary sprinkler system for both above-the ground and pop-up rotary sprinkler systems. In particular, it is desirable that the rotary sprinkler system provides a consistent and predictable watering pattern and volume. In addition, the rotary sprinkler system should also be configured to prevent excessive wear on the rotating parts of the system. Furthermore, it is desirable that the rotary sprinkler system controls the rate of rotation of the nozzle. More particularly, it is desirable that the rotary sprinkler system keeps the rate of nozzle rotation relatively constant.

BRIEF SUMMARY OF THE INVENTION

In view of the foregoing, it is an object of the present invention to provide an improved rotary sprinkler system that addresses the aforementioned and other undesirable aspects of prior art rotary sprinkler systems.

It is a further object of the present invention to provide a rotary sprinkler system having a consistent and predictable watering pattern and volume.

It is a further object of the present invention to provide a rotary sprinkler system that effectively and efficiently compensates for variable fluid flow rates and pressures.

It is a further object of the present invention to provide a rotary sprinkler system that prevents excessive wear on the rotating parts of the system.

It is a further object of the present invention to provide a rotary sprinkler system that controls the rate of rotation of the nozzle.

It is a further object of the present invention to provide a rotary sprinkler system that maintains a constant rate of rotation of the nozzle.

These and other objects not specifically enumerated here are addressed by the present invention which, in at least one embodiment, may include a nozzle driving assembly in rotary driving connection with a sprinkler nozzle according to fluid flow from a fluid source through the nozzle driving assembly to the sprinkler nozzle. In addition, the nozzle driving assembly includes a stator member, a turbine wheel, and a valve disc member, wherein the valve disc member is disposed between the stator member and the turbine wheel. In general, the turbine wheel includes a plurality of vanes disposed on an external circumference of the turbine wheel, wherein the vanes are positioned to receive fluid flow and thereby exert a force for inducing rotational movement to the turbine wheel. Moreover, the turbine wheel further includes at least one spoke extending from a hub to a circumference of the turbine wheel, wherein the spoke is configured to receive fluid flow so as to counteract at least a portion of the force and thereby limit a speed of rotational movement of the turbine wheel.

The present invention also contemplates a method for controlling nozzle rotation in a sprinkler including the provision of a sprinkler having a nozzle driving assembly in rotary connection with a sprinkler nozzle. The nozzle driving assembly includes a stator member, a turbine wheel and a valve disc, wherein the valve disc member is disposed between the stator member and the turbine wheel. The method further comprises directing a fluid flow through the stator member toward a periphery of the turbine wheel such that a first force is created to induce rotational movement of the turbine wheel. In addition, the method includes directing a portion of the fluid flow through the stator member toward an inner region of the turbine wheel such that a second force is created to counteract at least a portion of the first force and thereby limit a speed of rotational movement of the turbine wheel.

The present invention also contemplates a device for maintaining constant nozzle rotation in a sprinkler system comprising a wheel shaped device, a cup-shaped member and a disc shaped member. In general, the wheel shaped device comprises a plurality of vanes located on a perimeter of the wheel shaped device, wherein fluid flow against the vanes causes rotation of the device. In addition, the wheel shaped device also includes one or more chamfered spokes that extend radially from a central mount or hub to the perimeter of the device. Fluid flow against these chamfered spokes counteracts rotation of the device relative to an amount of fluid flow against the chamfered spokes. The cup-shaped member of the device includes a first plurality of openings for fluid flow therethrough in alignment with the vanes of the wheel-shaped device, and a second plurality of openings for fluid flow therethrough in alignment with the chamfered spokes of the wheel shaped device. Finally, the disc-shaped member, located between the cup-shaped member and the wheel-shaped device, is configured to bypass fluid through the second plurality of openings in response to increased fluid flow.

BRIEF DESCRIPTION OF THE DRAWINGS

Other features and advantages of the present invention will be seen as the following description of particular embodiments progresses in conjunction with the drawings, in which:

FIGS. 4A–4C illustrate various views of an embodiment of a high flow stator in accordance with the present invention;

FIGS. 5A–5C illustrate various views of an embodiment of a low flow stator in accordance with the present invention;

FIG. 9A illustrates a perspective top view of an embodiment of a turbine in accordance with the present invention;

FIG. 9B illustrates a perspective bottom view of an embodiment of a turbine in accordance with the present invention;

FIGS. 10A–10D illustrate alternate views of an embodiment of a turbine in accordance with the present invention;

DETAILED DESCRIPTION OF THE INVENTION

Figure 1:
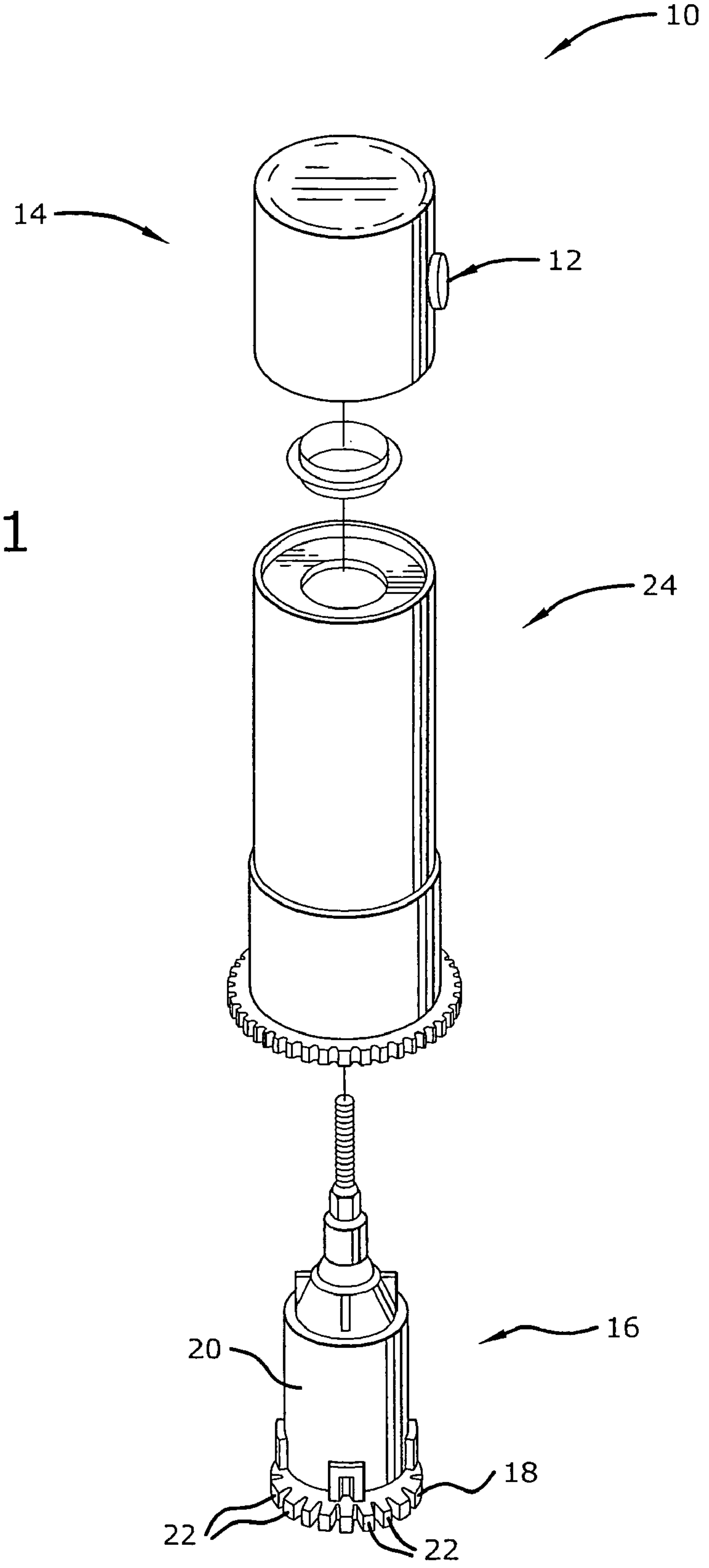
FIG. 1 is a sectional view of an embodiment of a prior art sprinkler system.
Figure 2A:
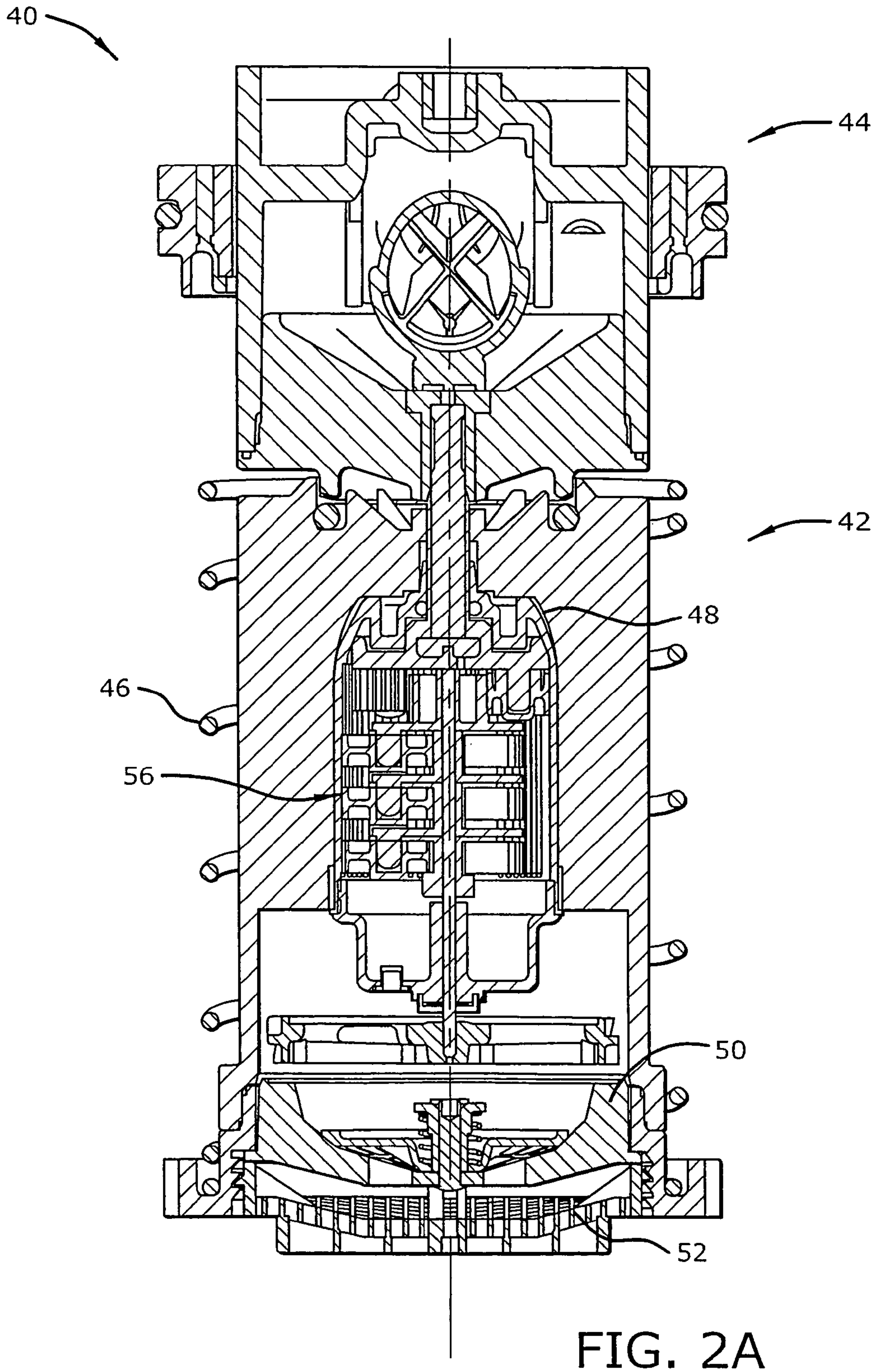
FIG. 2A illustrates a sectional view of an embodiment of a sprinkler system in accordance with the present invention.
Figure 2B:
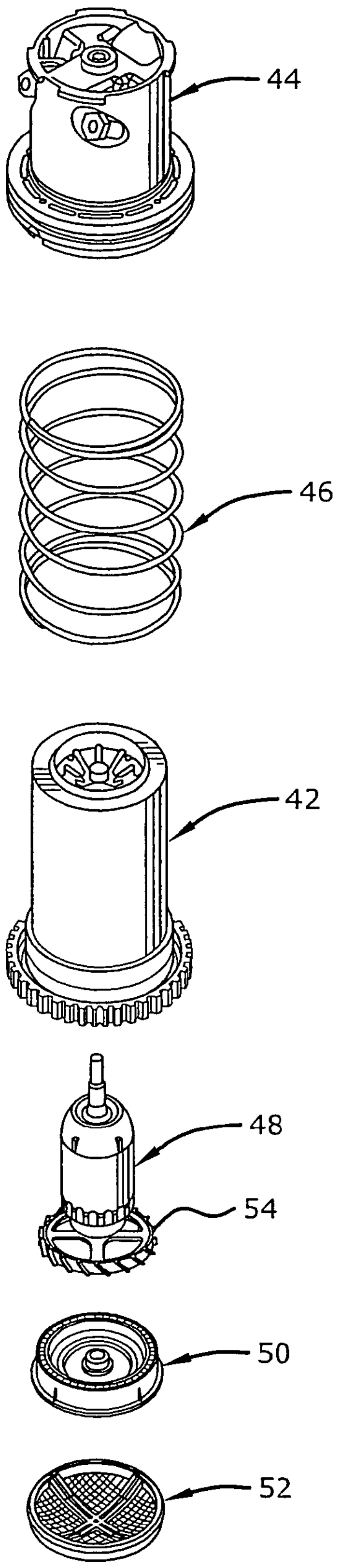
FIG. 2B illustrates an exploded, perspective view of an embodiment of a sprinkler system in accordance with the present invention.

Referring to FIGS. 2A and 2B, an embodiment of a rotary sprinkler system 40 in accordance with the present invention includes a riser assembly 42 and a nozzle base assembly 44 which are housed within a generally cylindrical housing (not shown). A return spring 46, also housed within the cylindrical housing, surrounds a portion of the riser assembly 42. The return spring 46 is compressible by water pressure and configured to cause the riser assembly 42, and hence the nozzle base assembly 44, to pop up out of the housing during use of the rotary sprinkler system. Although the following description is made with reference to pop-up type sprinklers, the invention is not limited thereto and can be used with any conventional rotating type sprinkler head.

Housed within the riser assembly 42 are a drive assembly 48, a stator assembly 50 and a screen 52. The screen 52, which is located near the fluid in-flow end of the sprinkler, prevents or greatly reduces the amount of debris, sand and sediment suspended in the water supply from entering into the water flow passage of the sprinkler and potentially clogging or abrading internal sprinkler components.

Figure 3A:
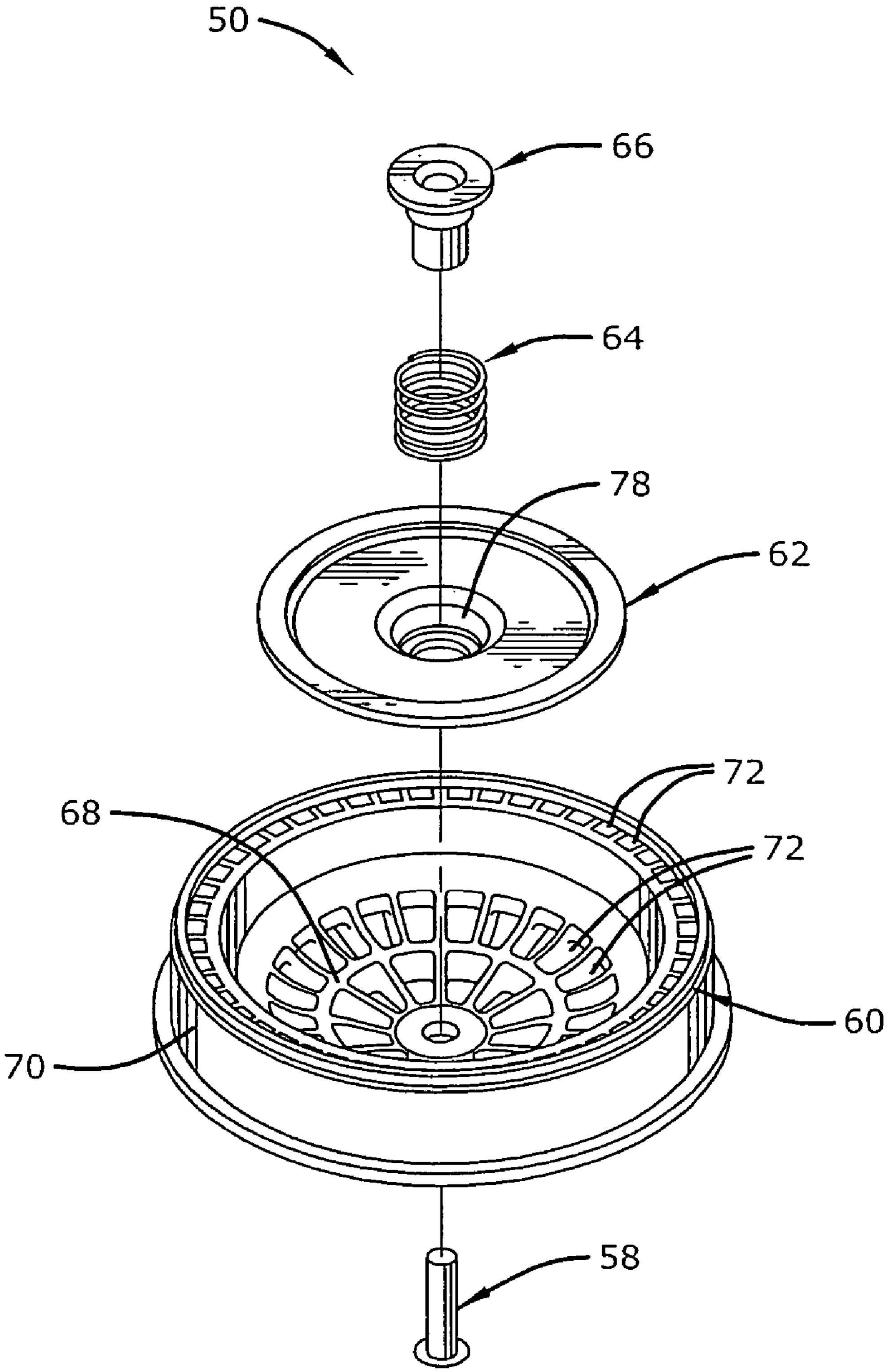
FIGS. 3A–3C illustrate various embodiments of a stator assembly in accordance with the present invention.
Figure 3B:
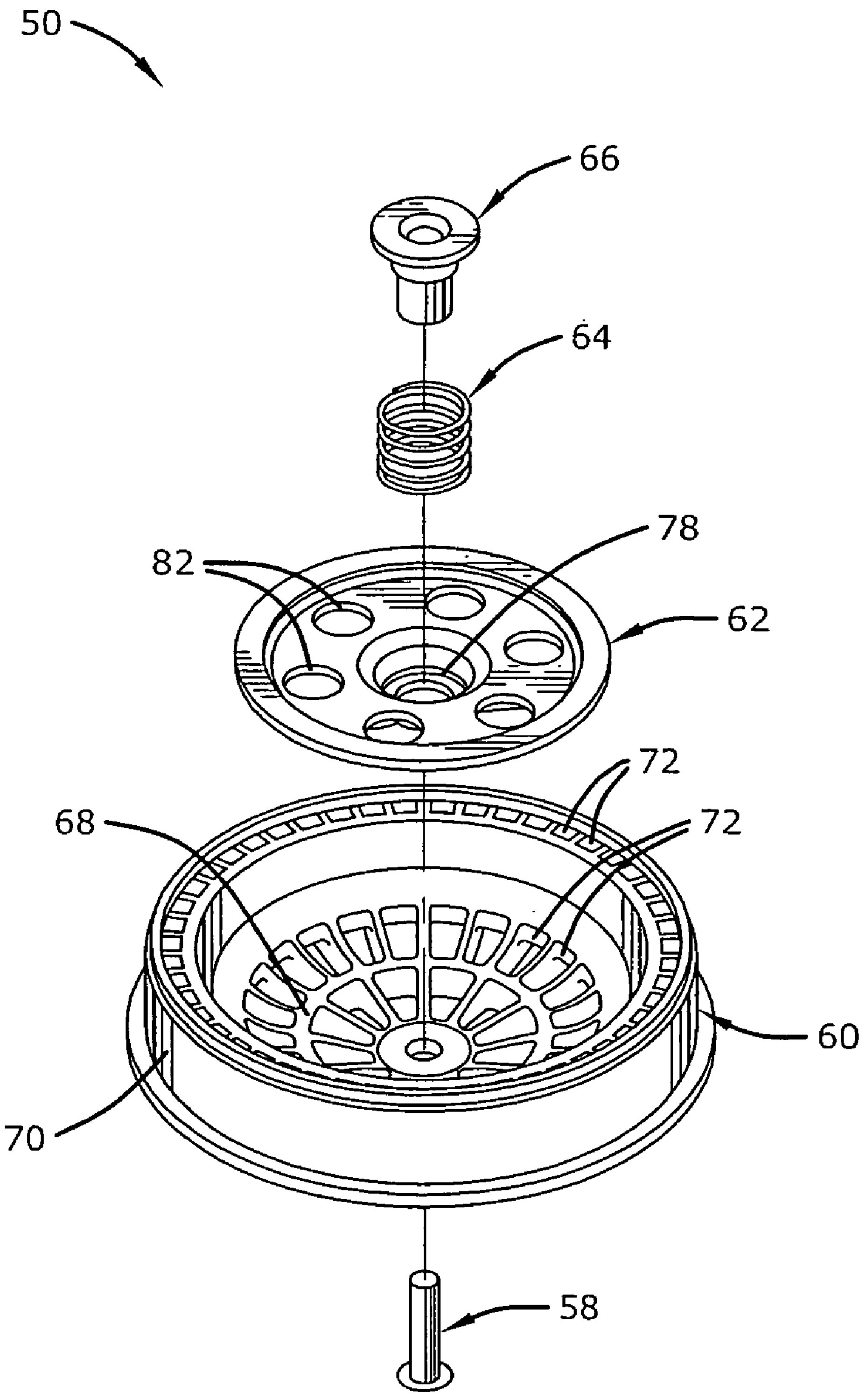
Figure 3C:
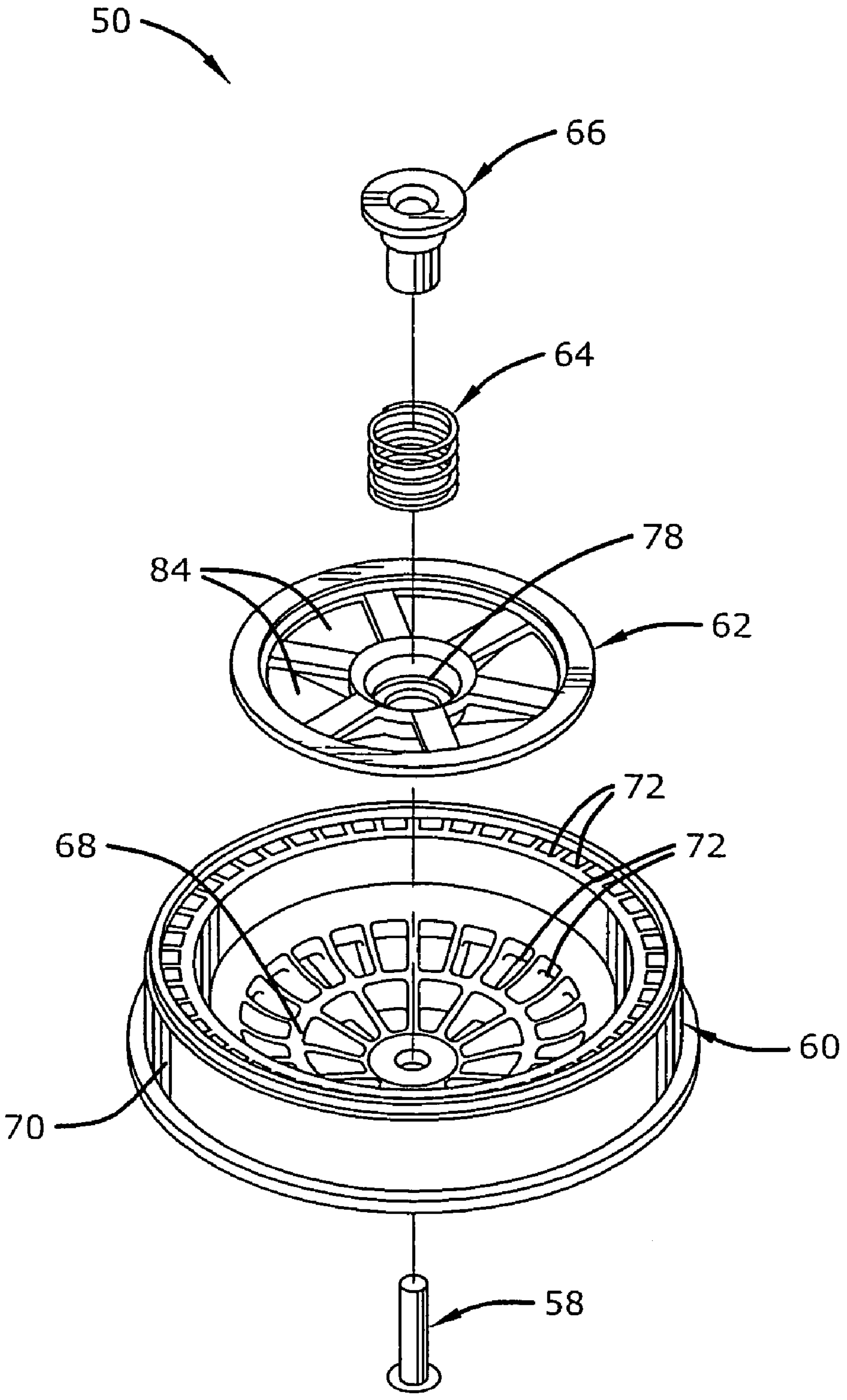

Adjacent the screen 52 is the stator assembly 50. In general, the stator assembly 50 controls fluid flow to the turbine 54 of the drive assembly 48, which drives the reduction gear train 56 and causes rotation of the nozzle 44. Referring to FIGS. 3A–3C, the stator assembly 50 includes a rivet 58, a stator 60, a valve disc 62, a spring 64 and a spring retainer 66. The rivet 58 and spring retainer 66 function to maintain the stator 60 at a fixed position yet permit the spring 64 and valve disc 62 to move along the longitudinal axis of the stator assembly 50 in response to fluid flow and velocity, as described in further detail below. Although the invention as disclosed herein generally refers to a rivet 58 and spring retainer 66, other retaining devices such as pins, snaps, screws, adhesives and welding components are also included within the scope of the claimed invention.

As shown in FIGS. 3A–3C, the stator is a generally cup-shaped member including a base portion 68 and a wall portion 70. One or more apertures or openings 72 located in the base and/or wall portions 68, 70 of the stator 60 direct fluid flow to the drive assembly 48 of the sprinkler. As such, the size, quantity, location and configuration of the apertures 72 of the stator 60 influence fluid flow and velocity through the stator 60 and, thereby, have an affect on the speed of nozzle rotation.

Figure 4C:
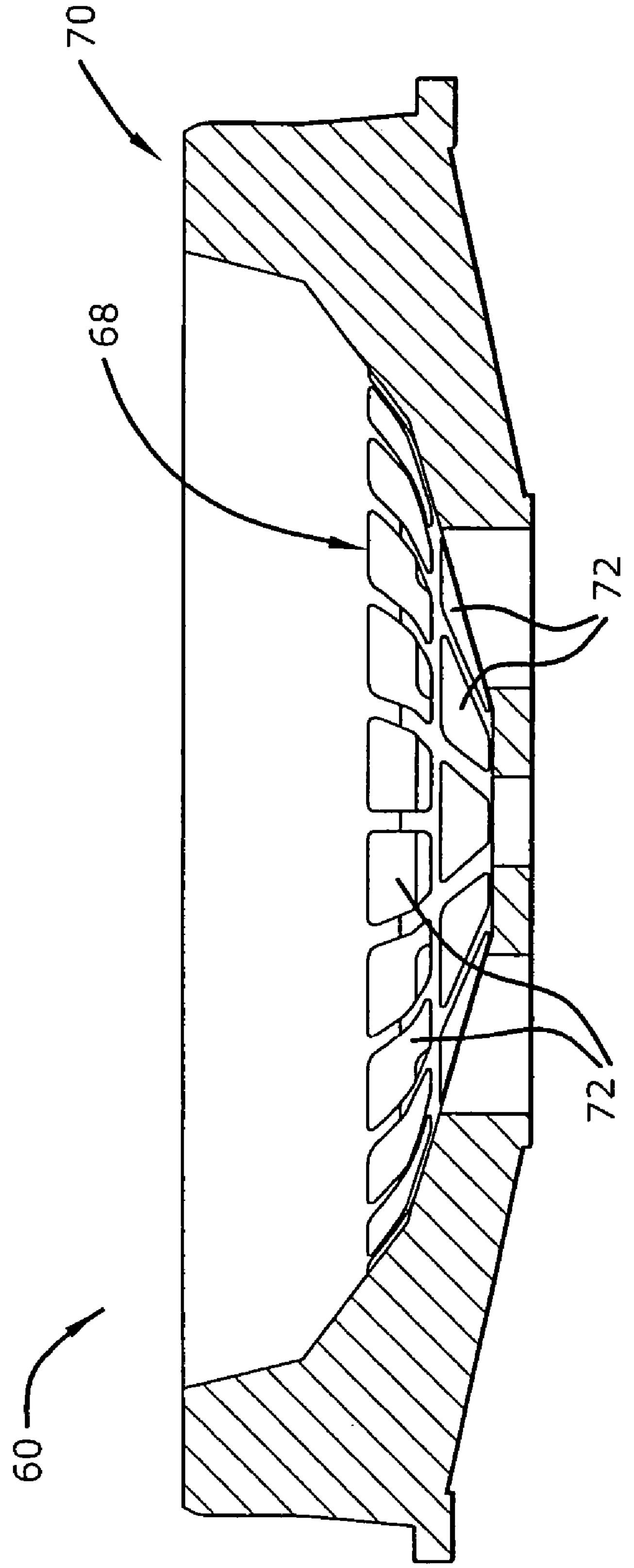

For example, FIGS. 4A–4C and 5A–5C, respectively, illustrate embodiments of a high flow stator and a low flow stator of the present invention. As shown in FIGS. 4A–4C, the high flow stator 60 includes three concentric aperture groups 74 centered about the longitudinal axis of the stator 60 and situated within the fluid flow passageway of the sprinkler. Two of the aperture groups 74 are positioned in the base portion 68 of the stator 60 and the remaining aperture group 74 is positioned in the wall portion 70 of the stator 60. Each aperture group 74 of the stator 60 further includes a plurality of quadrilateral-shaped openings 72 that are evenly spaced around the stator axis.

Figure 5C:
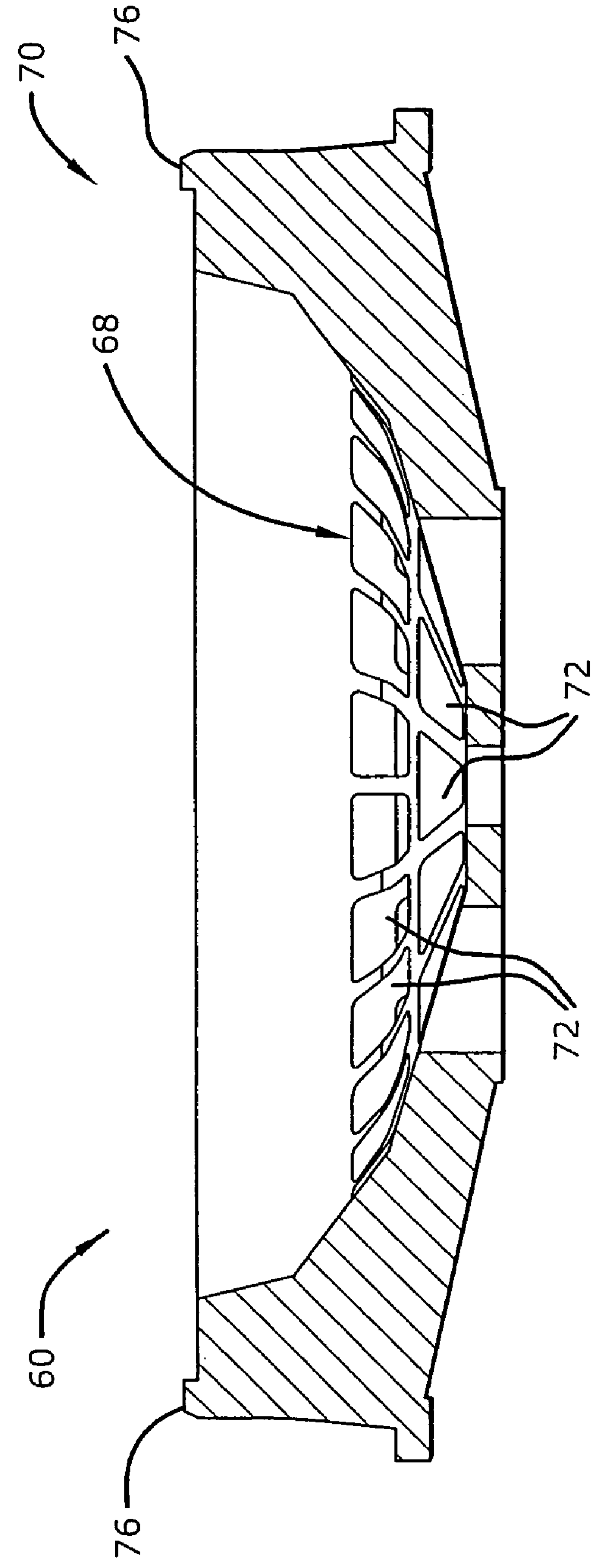

In general, the low flow stator of the present invention is configured similar to the high flow stator. However, as shown in FIGS. 5A–5C, the low flow stator 60 includes a rib or ridge 76 located along the wall portion 70 of the stator 60. The ridge 76 is configured to reduce the overall size or area of the openings 72 located along the wall portion 70 of the low flow stator, 60 as compared to the same openings 72 of the high flow stator 60. Since fluid flow is a function of both fluid volume and area, the reduced size of the openings 72 restricts fluid flow there-through and causes low flow, as implied by the name of this particular stator design.

In addition, the ridge 76 of the low flow stator 60 may also function to reduce turbulence as the fluid exits the openings 72 of the stator 60. Although the low flow stator and high flow stator have been described with respect to the illustrated figures, it is understood that alternate configurations of the stator 60, including the quantity, size, shape and location of the openings 72 and ridges 76, though not specifically disclosed herein, are also included within the scope of the claimed invention.

Referring back to FIGS. 3A–3C, a valve disc 62 is positioned adjacent to the stator 60 of the stator assembly 50. As with the stator 60, the valve disc 62 may be configured to accommodate various fluid flows. For example, the valve discs 62 illustrated in FIGS. 3A–3C are configured to accommodate low, medium and high fluid flows, respectively.

In one embodiment of the invention, shown in FIG. 3A, the valve disc 62 is a substantially solid, disc-shaped member formed of a relatively rigid plastic material and slightly curved to seat substantially within the base portion 68 of the stator 60. Although engineering thermoplastic is a preferred material, other durable, non-corrosive materials including, but not limited to, stainless steel, ceramic, and thermoset plastic, may also be used to fabricate the valve disc 62 of the present invention. Located near the center of the valve disc 62 is an annular opening or aperture 78. In general, the aperture 78 is configured to enable the spring retainer 66 to extend through the valve disc 62 and also allow the valve disc 62 to freely move along the length of the spring retainer 66.

Movement of the valve disc 62 is controlled in part by fluid flow and spring tension. In particular, the valve disc 62 and spring 64 function to regulate fluid flow through the stator assembly 50 and, thereby, regulate the speed of rotation of the sprinkler nozzle 44, as described in further detail below.

Figure 6A:
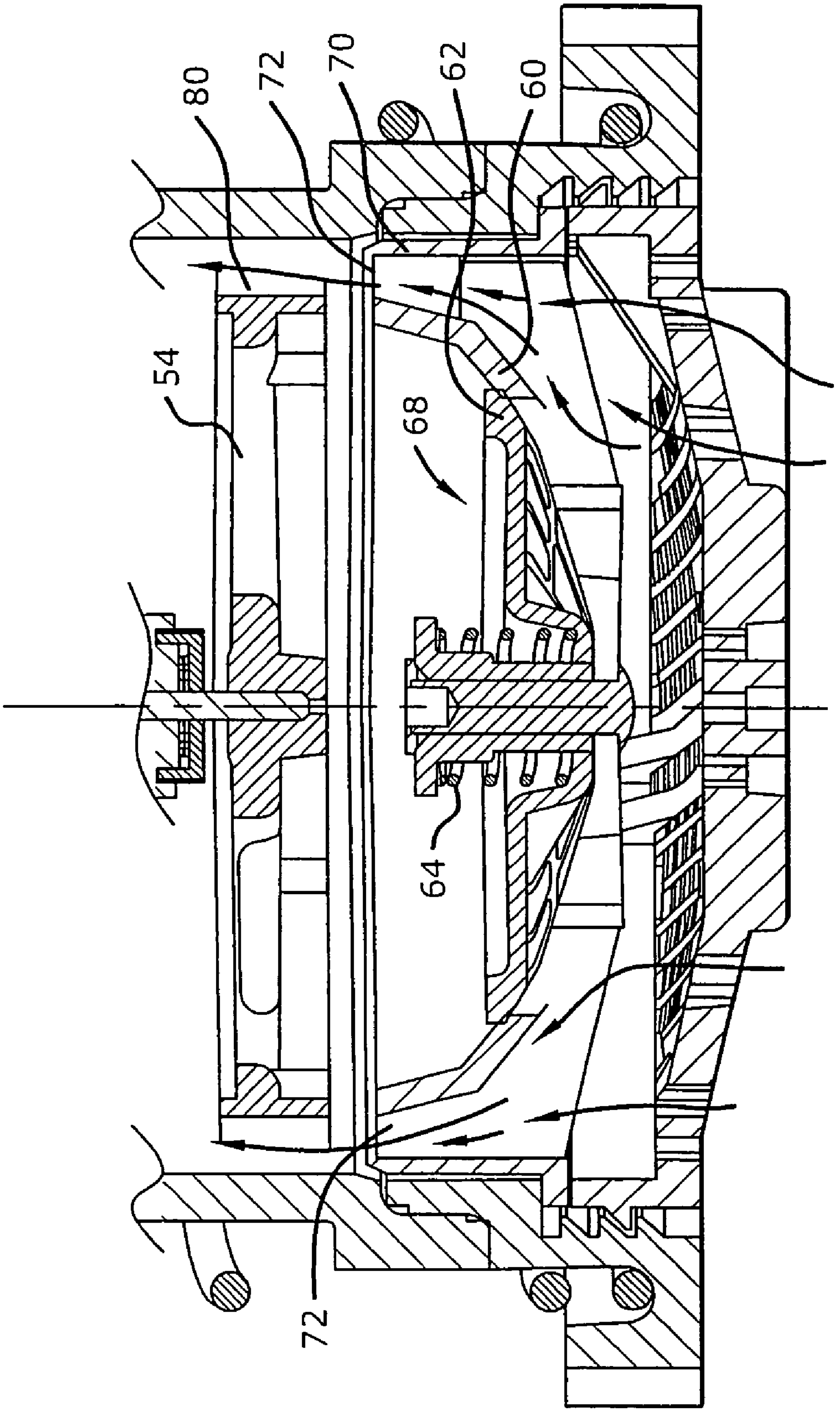
FIG. 6A illustrates a sectional view of an embodiment of a stator assembly when the valve disc is in the closed position in accordance with the present invention.

Referring to FIG. 6A, when fluid flows through the sprinkler system, the valve disc 62 remains fully seated within the base portion 68 of the stator 60 (e.g., in a closed position) and prevents fluid from flowing through the base portion openings 72. In this configuration, all fluid is channeled to flow through the apertures 72 located in the wall portion 70 of the stator 60 and in direct alignment with the turbine blades 80 of the drive assembly 48. (It should be noted that the arrows in the Figures represent fluid flow.) Fluid flowing against the turbine blades 80 causes rotation of the turbine 54 which, in turn, causes rotation of the sprinkler nozzle (not shown). However, because sprinkler systems are subject to variations in fluid flow, increased flow rates through the wall portion openings 72 of the stator assembly 50 not only increase speed of rotation of the turbine blades 80 but also increase speed of nozzle rotation, thereby producing inefficient and ineffective irrigation.

Figure 6B:
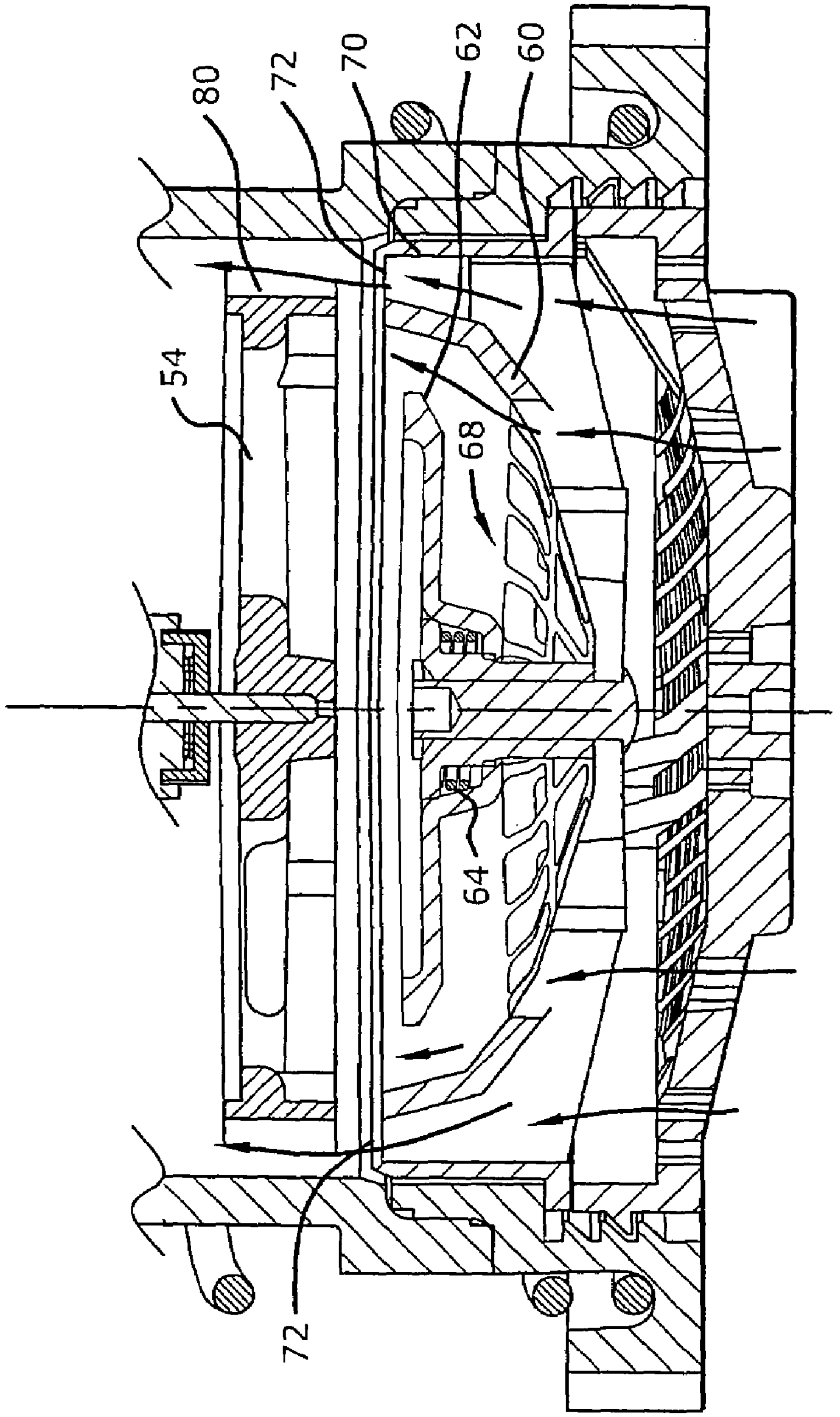
FIG. 6B illustrates a sectional view of an embodiment of a stator assembly when the valve disc is in the open position in accordance with the present invention.

To maintain constant nozzle rotation when the sprinkler is subject to increased fluid flow or velocity, excess water flow (e.g., water flow that is not required to drive the turbine 54 and maintain nozzle rotation) is bypassed around the blades 80 of the turbine 54. This is accomplished via the valve disc 62. When the pressure differential across the wall portion openings 72 of the stator 60 generated by the increased fluid flow and velocity is greater than the amount of force exerted by the spring 64 on the valve disc 62, the valve disc 62 opens or moves away from the base portion openings 72 of the stator 60 thereby compressing the spring 64, as shown in FIG. 6B. As a result, a portion of the fluid flows through the base portion openings 72 of the stator 60, thereby bypassing the blades 80 of the turbine 54 and reducing fluid flow through the wall portion openings 72 of the stator 60 back to initial flow rates.

In addition, when fluid flow or velocity decreases to the point where the pressure differential across the base portion openings 72 of the stator 60 is less than the amount of force generated by the compressed spring 64, the valve disc 62 closes or re-seats itself in the base portion 68 of the stator 60, as shown in FIG. 6A. As a result, fluid flow through the base portion openings 72 is blocked so that no fluid bypasses the turbine blades 80. Thus, despite variations in fluid flow and pressure, turbine 54 and nozzle rotation remain relatively constant. Therefore, by regulating fluid flow to the turbine blades 80, nozzle rotation is effectively controlled and remains relatively constant so that a consistent and predictable watering pattern and volume are produced.

In addition to solid valve disc 62 configurations, the valve disc 62 of the present invention may also include one or more openings to accommodate sprinkler systems having higher fluid flow rates. For example, sprinkler systems having medium flow rates would prematurely trigger the valve disc 62, shown in FIG. 3A, to bypass fluid flow around the turbine blades 80 so that even at normal (e.g., medium) fluid flow rates, an insufficient amount of fluid would be bypassed. As a result, the increased speed of turbine rotation would produce increased nozzle rotation and ineffective irrigation.

To allow more total bypass than would be possible with a solid valve disc 62 in the open position, one or more apertures are formed within the valve disc. In one embodiment, shown in FIG. 3B, one or more circular-shaped through-holes or ports 82 are formed within the valve disc 62 for use, for example, with medium flow sprinkler systems. In an alternate embodiment, shown in FIG. 3C, one or more quadrilateral-shaped openings 84, having a total area greater than the total area of the circular-shaped openings 82, are formed within the valve disc 62 for use, for example, with high flow sprinkler systems.

A variety of valve disc configurations not specifically described herein but included within the scope of the claimed invention may be used. In general, the size, shape, quantity and location of the openings in the valve disc are optimized to regulate the various fluid flow rates and pressures. Further, various barriers, ridges or other features may also be formed on the valve disc not only to regulate fluid flow but also to reduce fluid turbulence through the sprinkler.

Figure 7:
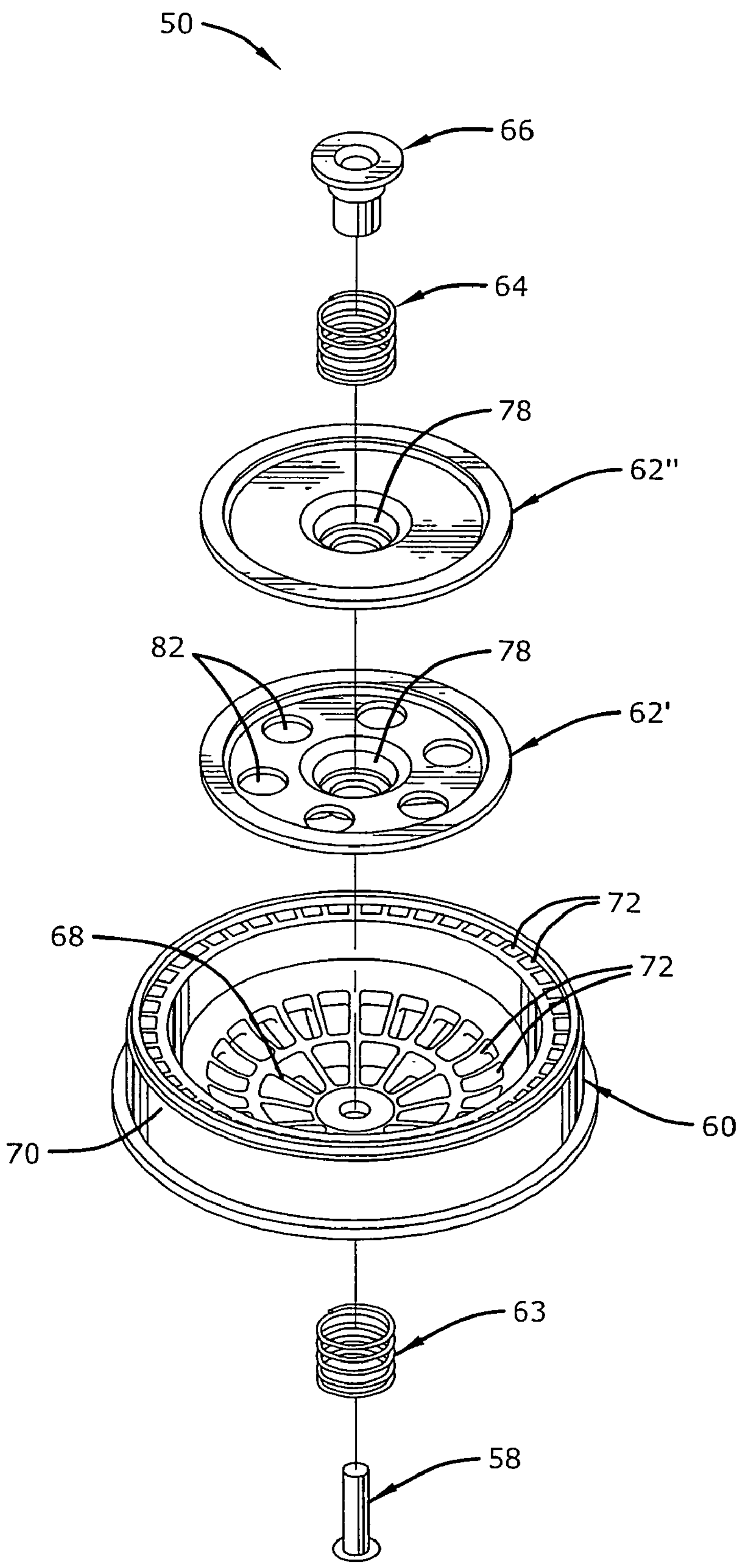
FIG. 7 illustrates an exploded, perspective view of an alternate embodiment of a stator assembly in accordance with the present invention.

In an alternate embodiment of the invention, the stator assembly 50 may include more than one valve disc 62. For example, as shown in FIG. 7, two valve discs 62', 62" are placed in alignment between the stator 60 and spring 64. In general, the discs 62', 62" are configured so that the first valve disc 62' (i.e., the valve disc that is adjacent to the stator 60) has a total bypass area that is greater than the total bypass area of the second valve disc 62". However, alternate valve disc configurations not specifically disclosed herein but known to those skilled in the art are also included within the scope of the claimed invention.

Unlike the previous embodiment of the stator assembly 50 in which the stator 60 remains at a fixed position along the longitudinal axis of the assembly, this embodiment of the invention is configured so that the central or first valve disc 62' remains stationary between the movable stator 60 and the second valve disc 62". Movement of the stator 60 and second valve disc 62" are controlled in part by fluid flow and spring tension, as described in further detail below.

Figure 8A:
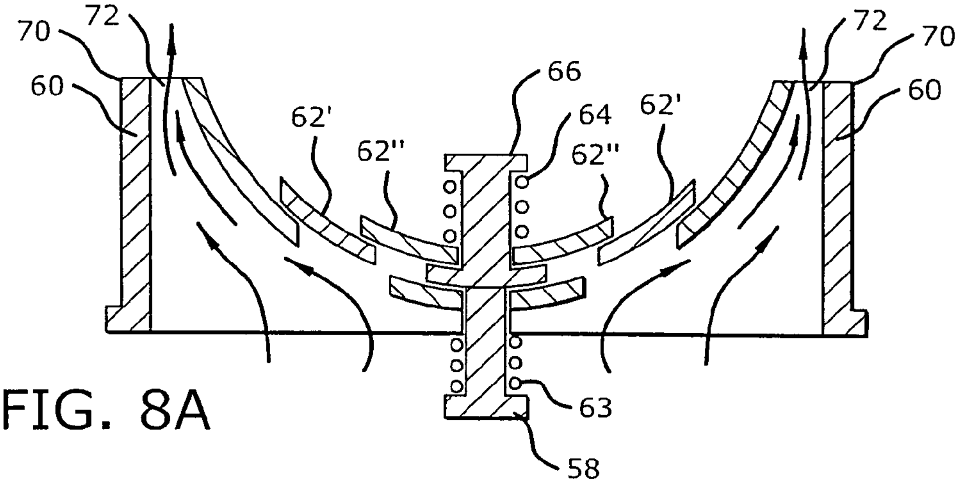
FIG. 8A illustrates the stator assembly of FIG. 7 in a closed position in accordance with the present invention.

Referring to FIG. 8A, when fluid flows through the sprinkler system, the valve discs 62', 62" remain fully seated within the base portion 68 of the stator 60. Fluid flow is thereby channeled through the wall portion openings 72 of the stator 60, which are in direct alignment with the turbine blades of the drive assembly (not shown). Fluid flowing against the turbine blades causes rotation of the turbine which, in turn, causes rotation of the sprinkler nozzle (not shown).

Figure 8B:
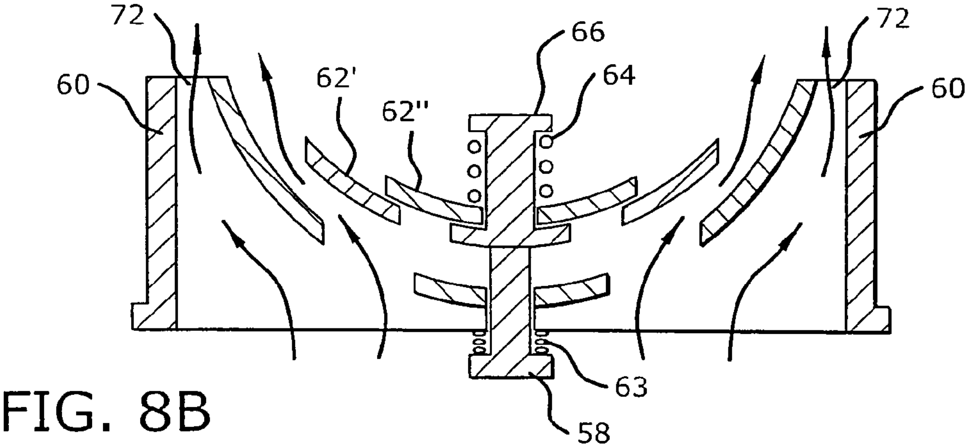
FIG. 8B illustrates the stator assembly of FIG. 7 is a partially open position in accordance with the present invention.

When fluid flow or velocity increases so that the pressure differential across the wall portion openings 72 of the stator 60 is greater than the amount of force exerted by the second spring 63 on the stator 60, the stator 60 opens or moves along the longitudinal axis of the assembly and away from the valve discs 62', 62", as shown in FIG. 8B. As a result, a portion of the fluid flows through the base portion openings 72 of the stator 60, thereby bypassing the blades of the turbine and reducing fluid flow through the wall portion openings 72 of the stator 60 back to initial flow rates.

Figure 8C:
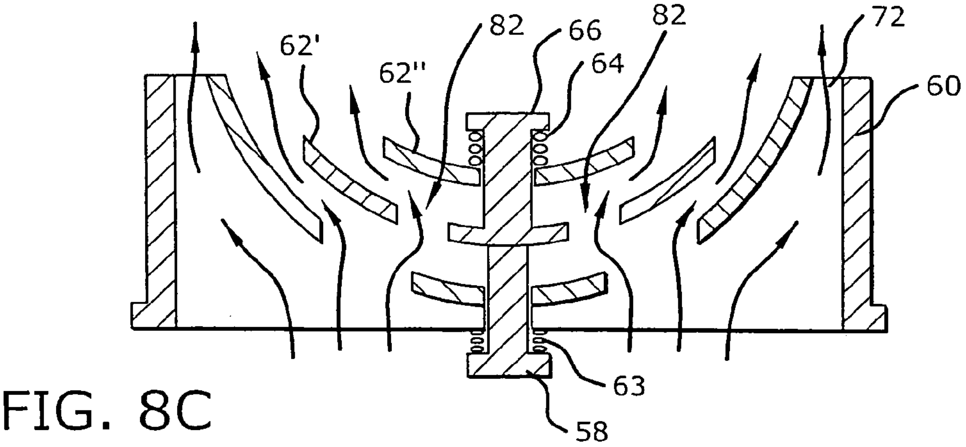
FIG. 8C illustrates the stator assembly of FIG. 7 in an open position in accordance with the present invention.

However, when fluid flow or velocity increases even further so that the pressure differential across the wall portion openings 72 of the stator 60 is greater than the amount of force exerted by both springs 63, 64, then the second valve disc 62" will also open or move away from the first valve disc 62'. As shown in FIG. 8C, a portion of the fluid flows not only through the base portion openings 72 of the stator 60 but also through the openings 82 of the first valve disc 62'. This sprinkler configuration maximizes the total fluid that bypasses the turbine blades and reduces fluid flow through the wall portion openings 72 of the stator 60 back to initial flow rates. As a result, fluid flow to the turbine blades is regulated and nozzle rotation remains relatively constant. Furthermore, consistent and predictable watering patterns and volumes are thereby produced.

In general, by maximizing the total fluid bypass, the total flow area is also maximized and the average water velocity across the stator assembly and turbine is minimized for the given flow rate. By doing this, the pressure differential or friction loss across the stator assembly and turbine is minimized, thereby maximizing the pressure at the nozzle. As a result, the sprinkler system is able to achieve the highest possible radius of throw with nozzle rotation remaining relatively constant so that a consistent and predictable watering pattern and volume are produced.

To accommodate even higher pressure differentials, a constant velocity turbine may be used with the sprinkler system of the present invention. As previously disclosed, the turbine 54 drives the gear reduction train 56 that converts rotation of the turbine 54 to rotation of the nozzle 44 at a speed slower than the speed of rotation of the turbine 54. To maintain a relatively constant and controlled nozzle rotation, one or more chamfered spokes 86 are included on the turbine 54, as shown in FIGS. 9A and 9B. As described in further detail below, the chamfered spokes 86 counteract the spin of the turbine in direct relation to the amount of water that bypasses the driving blades of the turbine.

In one embodiment of the invention, the turbine 54 is a wheel shaped device including a central mount 88, a ring-like member 90 and one or more spokes or ribs 86 that extend radially from the central mount 88 to the interior surface of the ring-like member 90. As shown in FIGS. 9A and 9B, these components are arranged to form one or more through-holes or apertures 92 for passing fluid through the turbine 54 and to the nozzle base assembly 44 of the sprinkler system (not shown).

As previously described, a plurality of angled blades or vanes 94 are also formed along the exterior surface of the ring-like member 90 and in direct alignment with the flow path from the wall portion openings of the stator assembly (not shown). In general, the angle of the turbine blades 90 is optimized to generate the greatest amount of turbine rotation in response to fluid flow. With this configuration, the force of fluid flow causes rotation of the turbine 54 and, hence, nozzle rotation via the gear reduction train of the drive assembly (not shown).

To compensate for increases in fluid flow and maintain constant nozzle rotation, a chamfer or beveled edge 96 is formed along a linear-shaped portion of the turbine spoke 86. As shown in FIGS. 10A–10D, the linear-shaped portion of each spoke 86 includes a top surface 98, a first side surface 96, a bottom surface 100 and a second side surface 102. Generally, the first side surface 96, bottom surface 100 and second side surface 102 face the fluid inlet (not shown), whereas the top surface 98 of the spoke 86 faces the fluid outlet (not shown) of the sprinkler system.

In one embodiment of the invention, the first side surface 96 of the turbine spoke 86 is chamfered or beveled at an angle X that is approximately fifty-degrees relative to the longitudinal axis of the sprinkler system. In addition, as shown in FIG. 10D, the blades or vanes 94 formed along the perimeter of the turbine 54 are also slanted but at an angle Y of approximately three-hundred-twenty degrees (or forty degrees negative) to the same axis. It should be noted that these specific dimensions are given for illustration only and it is understood that a variety of dimensions may be used and, thus, are within the scope of the claimed invention. However, in general, the first side surface 96 and the blades 94 of the turbine 54 are angled opposite to one another, with the angle of the first side surface 96 being greater than the angle of the blades 94. This arrangement provides for a more consistent and controlled turbine rotation, and hence nozzle rotation, as explained in further detail below.

Referring to FIG. 10C, the second side surface 102 together with the top surface 100 of the turbine spoke 86 present a smaller profile to the incoming fluid flow compared to the first side surface 96. Moreover, the second side surface 102 also includes a smooth, rounded edge at the transition area between the top surface 100 and the second side surface 102. This particular configuration not only reduces fluid turbulence but also ensures that the greatest amount of fluid flow and force impinges of the first side surface 96 of the turbine spoke 86.

During operation of the sprinkler system and as noted in the Background of the Invention, unanticipated increases in fluid flow and velocity during use of the sprinkler system may negatively affect watering patterns and volumes. As the present invention substantially eliminates these undesirable effects, it is instructive to describe the operation and resulting fluid flow characteristics of the present invention. For this purpose, reference is made to FIGS. 11A and 11B.

Figure 11A:
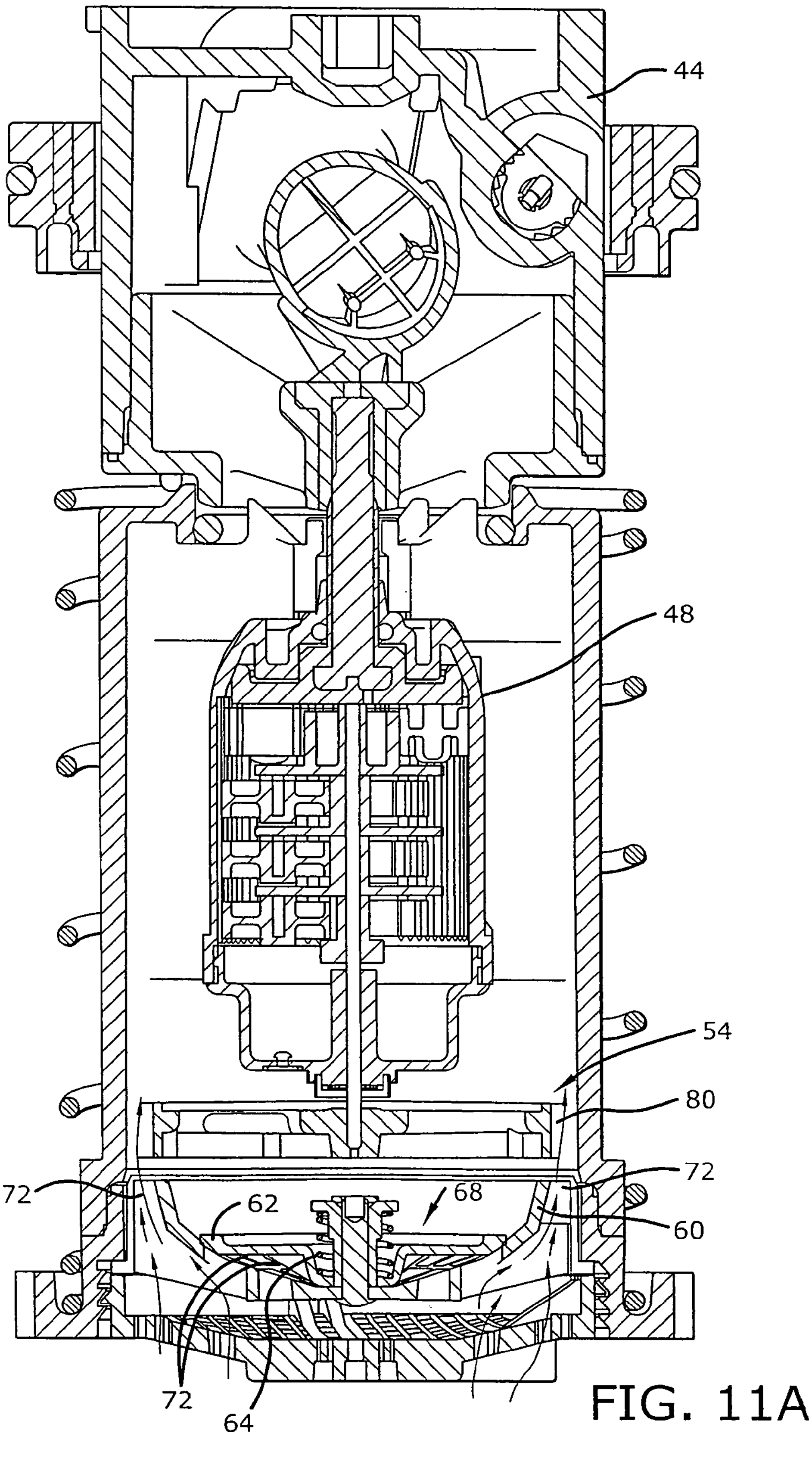
FIG. 11A illustrates a sectional view of an embodiment of a sprinkler system when the valve disc is in the closed position in accordance with the present invention.

Referring to FIG. 11A, when there is a specified fluid flow through the sprinkler components, the valve disc 62 remains fully seated within the base portion 68 of the stator 60. Fluid flow is thereby channeled through the wall portion openings 72 of the stator 60, which are in direct alignment with the turbine blades 80 of the drive assembly 48. Fluid flowing against the turbine blades 80 causes rotation of the turbine 54 in, for example, a counterclockwise direction which, in turn, causes rotation of the sprinkler nozzle 44 also in a counterclockwise direction.

Figure 11B:
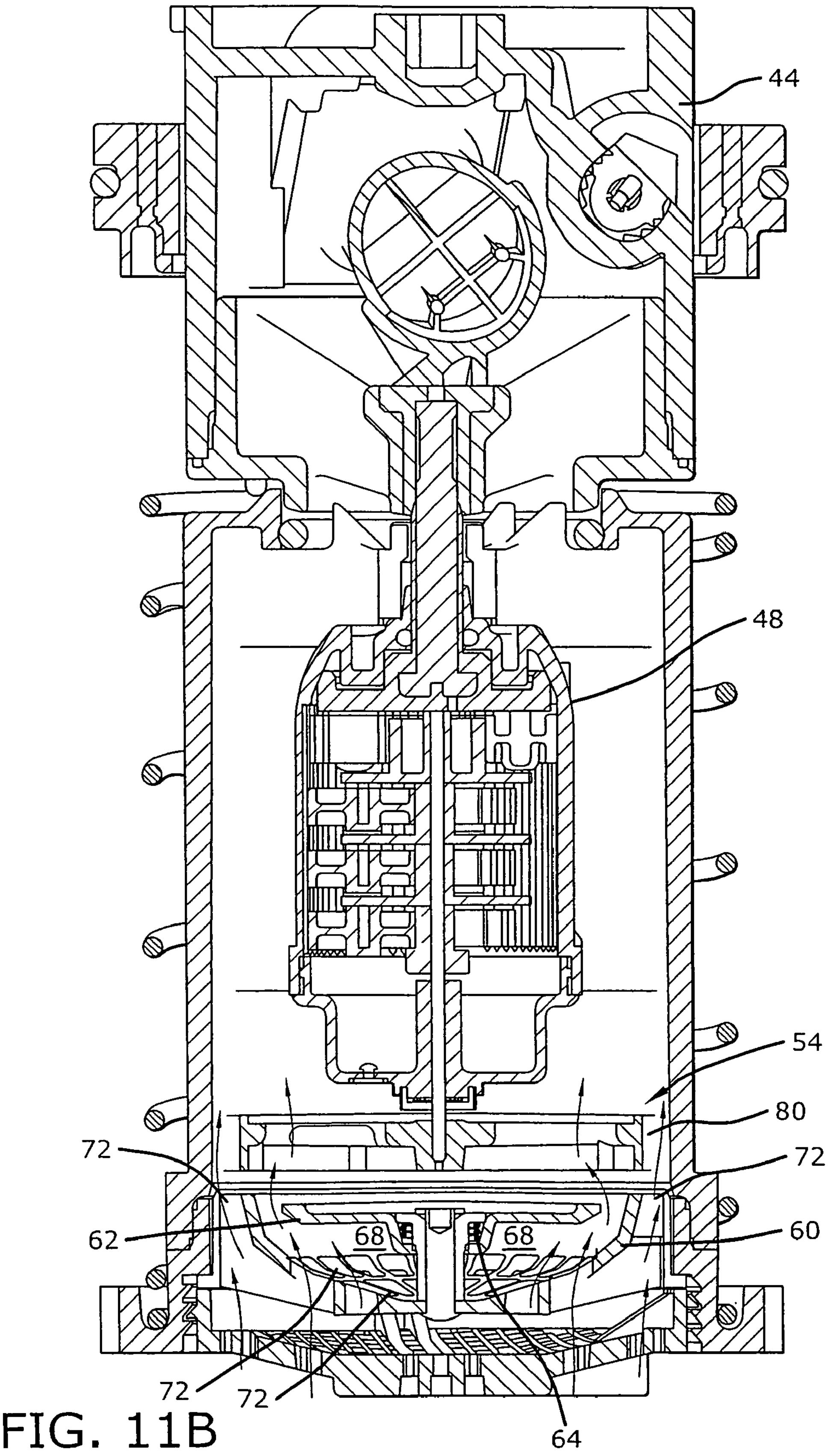
FIG. 11B illustrates a sectional view of an embodiment of a sprinkler system when the valve disc is in the open position in accordance with the present invention.

As previously disclosed, increases beyond the specified fluid flow and velocity in the sprinkler system generate increased turbine 54 and nozzle 44 rotation, resulting in improper irrigation patterns and volumes. However, this increased fluid flow and velocity also create a pressure differential across the wall portion openings 72 of the stator 60. When the pressure differential across the wall portion openings 72 of the stator 60 exceeds the amount of force exerted by the spring 64 on the valve disc 62, the valve disc 62 opens or moves away from the base portion openings 72 of the stator 60 thereby compressing the spring 64, as shown in FIG. 11B. As a result, a portion of the fluid flows through the base portion openings 72 of the stator and bypasses the blades 80 of the turbine 54.

The portion of fluid that bypasses the turbine blades 80 now flows through the turbine apertures 92 and impinges on the turbine spokes 86. In particular, because the first side surface 96 of each spoke 86 is angled opposite to that of the turbine blades 80, fluid flow striking against the first side surface or chamfered edge 96 of each spoke 86 generates a force in a direction opposite to the force generated by fluid flow striking the turbine blades 80. In other words, the bypass fluid generates, for example, a clockwise rotational force on the turbine 54. The force generated by the bypass fluid counteracts the increased spin or rotation of the turbine 54 in an amount that is directly related to the amount of water that bypasses the driving blades 80 of the turbine 54. Thus, even though fluid flow and velocity have increased, turbine 54 and, thereby, nozzle 44 rotation remain relatively constant. As a result, the sprinkler system of the present invention produces consistent and predictable watering patterns and volumes even when subject to unconventional increases in fluid flow and velocity.

Although the invention has been described in terms of particular embodiments and applications, one of ordinary skill in the art, in light of this teaching, can generate additional embodiments and modifications without departing from the spirit of or exceeding the scope of the claimed invention. For example, although the above described embodiment of the sprinkler system included only one valve disc in its stator assembly, it is understood that alternate embodiments of the sprinkler system including, but not limited to, those with more than one valve disc, solid valves discs, valve discs with through-holes and alternate stator assembly designs are also included within the scope of the claimed invention. Accordingly, it is to be understood that the drawings and descriptions herein are proffered by way of example to facilitate comprehension of the invention and should not be construed to limit the scope thereof.

What is claimed is:

1. A device for controlling nozzle rotation in a sprinkler comprising:

a nozzle driving assembly for inducing rotation of a sprinkler nozzle;

said nozzle driving assembly having a stator member, and a turbine wheel;

said turbine wheel including a plurality of vanes positioned on said turbine wheel to receive fluid flow and thereby exert a force for inducing rotational movement to said turbine wheel, said rotational movement of said turbine wheel also inducing said rotation of said sprinkler nozzle; and, said turbine wheel further including at least one member disposed on said turbine wheel so as to counteract at least a portion of said force and thereby limit a speed of rotational movement of said turbine wheel.

2. The device of claim 1, wherein said vanes are angled to generate a greatest amount of rotational movement to said turbine wheel in response to fluid flow.

3. The device of claim 1, wherein said member extends from a central region of said turbine wheel to a peripheral region of said turbine wheel and includes a first side surface, a top surface, a bottom surface and a second side surface.

4. The device of claim 3, wherein at least a portion of said first side surface is chamfered.

5. The device of claim 3, wherein at least a portion of said first side surface is chamfered at an angle approximately fifty-degrees relative to a longitudinal axis of said device.

6. The device of claim 3, wherein said first side surface and said vanes are angled approximately opposite to one another.

7. The device of claim 6, wherein said angle of said first side surface is greater than said angle of said vanes.

8. The device of claim 1, further comprising a valve member disposed between said stator member and said turbine wheel.

9. The device of claim 8, wherein said valve member is a substantially solid, disc-shaped member.

10. The device of claim 8, wherein said valve member includes at least one biased opening to accommodate fluid flow therethrough.

11. A method for controlling nozzle rotation in a sprinkler comprising:

providing a sprinkler having a nozzle driving assembly, said nozzle driving assembly having a stator member and a turbine wheel;

directing a fluid flow through said stator member to said turbine wheel such that a first force is created to induce rotational movement of said turbine wheel and thereby cause rotation of a nozzle in said sprinkler; and, directing a portion of said fluid flow through said stator member to said turbine wheel such that a second force is created to counteract at least a portion of said first force and thereby limit a speed of rotational movement of said turbine wheel.

12. The method of claim 11, wherein said directing a portion of said fluid flow to said turbine wheel is in response to increased fluid flow through said sprinkler.

13. The method of claim 11 further comprising bypassing a portion of a fluid flow through openings along a wall of said stator to openings along a base of said stator.

14. The method of claim 13, wherein said bypassing a portion of fluid flow through said stator is accomplished using a valve member interposed between said stator and said turbine wheel.

15. The method of claim 14, further comprising bypassing a portion of a fluid flow through openings along a wall of said stator to openings along a base of said stator and formed within said valve member.

16. The method of claim 11, wherein directing a portion of said fluid flow through said stator member optimizes a total fluid that creates said first force.

17. The method of claim 11, wherein directing a portion of said fluid flow through said stator member optimizes a pressure differential across said stator member and said turbine wheel.

18. The method of claim 11, wherein directing a portion of said fluid flow through said stator member optimizes a pressure at said nozzle.

19. The method of claim 11, further comprising maintaining optimal nozzle rotation so that a consistent and predictable watering pattern and volume are produced.

20. The method of claim 19, further comprising maximizing a throw radius of said fluid flow while maintaining optimal nozzle rotation.

* * * * *